US011150662B2

(12) United States Patent
Nakadai et al.

(10) Patent No.: US 11,150,662 B2
(45) Date of Patent: Oct. 19, 2021

(54) VEHICLE CONTROL SYSTEM, SELF-DRIVING VEHICLE, VEHICLE CONTROL METHOD, AND PROGRAM

(71) Applicant: NEC Corporation, Tokyo (JP)

(72) Inventors: Shinji Nakadai, Tokyo (JP); Satoshi Morinaga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 212 days.

(21) Appl. No.: 16/499,372

(22) PCT Filed: Mar. 30, 2017

(86) PCT No.: PCT/JP2017/013273
§ 371 (c)(1),
(2) Date: Sep. 30, 2019

(87) PCT Pub. No.: WO2018/179236
PCT Pub. Date: Oct. 4, 2018

(65) Prior Publication Data
US 2020/0026300 A1    Jan. 23, 2020

(51) Int. Cl.
*G08G 1/09*     (2006.01)
*G05D 1/02*     (2020.01)
(Continued)

(52) U.S. Cl.
CPC ......... *G05D 1/0214* (2013.01); *G05D 1/0088* (2013.01); *G05D 1/0287* (2013.01);
(Continued)

(58) Field of Classification Search
CPC ......... G08G 1/09; B60W 30/146; G05D 1/02; G05D 1/00; G05D 1/0214; G05D 1/0088; G05D 1/0276
See application file for complete search history.

(56) References Cited

U.S. PATENT DOCUMENTS

| 5,944,768 A * | 8/1999 | Ito | G08G 1/0969 |
| | | | 701/418 |
| 6,594,580 B1 * | 7/2003 | Tada | G01C 21/26 |
| | | | 340/990 |

(Continued)

FOREIGN PATENT DOCUMENTS

| JP | 2015-072650 A | 4/2015 |
| JP | 2016-071566 A | 5/2016 |
| WO | 2008/062897 A1 | 5/2008 |

OTHER PUBLICATIONS

International Search Report for PCT Application No. PCT/JP2017/013273, dated Jun. 27, 2017.

*Primary Examiner* — Tan Q Nguyen
(74) *Attorney, Agent, or Firm* — Sughrue Mion, PLLC

(57) ABSTRACT

The planned route creating unit 3 creates a planned route of the self-driving vehicle 10. The non-traveling area plan creating unit 4 creates a plan of the non-traveling area, which is an area where the self-driving vehicle 10 can travel and which is an area set as an area where the self-driving vehicle 10 does not travel. The non-traveling area plan creating unit 4 creates a plan of the non-traveling area at a frequency lower than the frequency at which the planned route creating unit 3 creates a planned route. The transmission unit 6 transmits the plan of the non-traveling area to the other vehicle each time the plan of the non-traveling area is created.

9 Claims, 14 Drawing Sheets

(51) Int. Cl.
*G05D 1/00* (2006.01)
*B60W 30/165* (2020.01)
(52) U.S. Cl.
CPC ............ *G08G 1/09* (2013.01); *G05D 1/0276* (2013.01); *G05D 2201/0213* (2013.01)

(56) References Cited

U.S. PATENT DOCUMENTS

| | | | |
|---|---|---|---|
| 2006/0247852 A1* | 11/2006 | Kortge | G01C 22/00 |
| | | | 701/533 |
| 2010/0042282 A1 | 2/2010 | Taguchi et al. | |
| 2012/0029804 A1* | 2/2012 | White | G01C 21/20 |
| | | | 701/455 |
| 2014/0244153 A1* | 8/2014 | Dorum | G01C 21/3632 |
| | | | 701/409 |
| 2017/0235307 A1* | 8/2017 | Asakura | B60W 40/12 |
| | | | 701/23 |
| 2017/0236422 A1 | 8/2017 | Naka et al. | |

\* cited by examiner

VEHICLE CONTROL SYSTEM, SELF-DRIVING VEHICLE, VEHICLE CONTROL METHOD, AND PROGRAM

This application is a National Stage Entry of PCT/JP2017/013273 filed on Mar. 30, 2017, the contents of all of which are incorporated herein by reference, in their entirety.

TECHNICAL FIELD

The present invention relates to a vehicle control system, a self-driving vehicle, a vehicle control method, and a vehicle control program.

BACKGROUND ART

PTL 1 describes that a self-driving vehicle A acquires a traveling control plan of a self-driving vehicle B generated by another self-driving vehicle B by inter-vehicle communication using radio waves such as 2.4 GHz. The traveling control plan of the self-driving vehicle B includes a subordinate plan including a traveling locus. Furthermore, PTL 1 describes that the self-driving vehicle A takes into consideration the subordinate plan of the self-driving vehicle B and evaluates the traveling control plan of the self-driving vehicle A and the like.

CITATION LIST

Patent Literature

PTL 1: International Publication No. 2008/062897

SUMMARY OF INVENTION

Technical Problem

It is conceivable that each self-driving vehicle receives a plan of the route of another self-driving vehicle by inter-vehicle communication, and creates or reviews a plan of the host vehicle on the basis of the route of the other self-driving vehicle.

However, even if a self-driving vehicle, which is the transmission source of the route plan, controls the vehicle so as to cause the self-driving vehicle to travel along the set route, actually there is a difference between the route set as the plan and the actual traveling route. This difference is caused by environment, for example, such as changes in road surface conditions and sudden cross winds. The self-driving vehicle travels while updating the route plan while detecting a change in conditions. In such a case, the frequency of inter-vehicle communication becomes extremely high if each time the self-driving vehicle updates the route plan, it transmits the updated plan to other self-driving vehicles existing in the vicinity. Further, the self-driving vehicle having received the route plan of the other self-driving vehicle determines whether to review the route plan of the host vehicle according to the received plan. As described above, when the frequency of communication becomes high, the self-driving vehicle having received the route plan of another self-driving vehicle must frequently make such a determination. On the other hand, the route updated according to the change of the environment as described above does not necessarily change significantly. Therefore, although the self-driving vehicle having received the route plan of another self-driving vehicle must frequently make the above determination, in fact, it is not often that the plan of the self-driving vehicle having received the plan must be reviewed.

Therefore, the present invention has an object to provide a vehicle control system, a self-driving vehicle, a vehicle control method, and a vehicle control program capable of reducing the frequency of inter-vehicle communication and reducing the processing load of a self-driving vehicle that receives a plan of another self-driving vehicle.

Solution to Problem

The vehicle control system according to the present invention is a vehicle control system provided in a self-driving vehicle, the vehicle control system including: a planned route creating unit that creates a planned route of the self-driving vehicle; a non-traveling area plan creating unit that creates a plan of a non-traveling area, which is an area where the self-driving vehicle can travel and which is an area set as an area where the self-driving vehicle does not travel; and a transmission unit that transmits the plan of the non-traveling area to other vehicles, in which, the non-traveling area plan creating unit creates the plan of the non-traveling area at a frequency lower than a frequency at which the planned route creating unit creates the planned route, and the transmission unit transmits the plan of the non-traveling area to other vehicles each time the plan of the non-traveling area is created.

Further, a self-driving vehicle according to the present invention includes the above-described vehicle control system.

Further, a vehicle control method according to the present invention, by a computer provided in a self-driving vehicle, includes: creating a planned route of the self-driving vehicle; creating a plan of a non-traveling area, which is an area where the self-driving vehicle can travel and which is an area set as an area where the self-driving vehicle does not travel, at a frequency lower than a frequency at which the planned route is created; and transmitting the plan of the non-traveling area to other vehicles each time the plan of the non-traveling area is created.

Further, a vehicle control program according to the present invention is a vehicle control program installed in a computer provided in a self-driving vehicle, the vehicle control program causing the computer to execute: planned route creation processing for creating a planned route of the self-driving vehicle; non-traveling area plan creation processing for creating a plan of a non-traveling area, which is an area where the self-driving vehicle can travel and which is an area set as an area where the self-driving vehicle does not travel; and transmission processing for transmitting the plan of the non-traveling area to other vehicles, in which the non-traveling area plan creation processing creates the plan of the non-traveling area at a frequency lower than a frequency at which the planned route creation processing creates the planned route, and the transmission processing transmits the plan of the non-traveling area to other vehicles each time the plan of the non-traveling area is created.

Advantageous Effects of Invention

According to the present invention, it is possible to reduce the frequency of inter-vehicle communication and to reduce the processing load of a self-driving vehicle that receives a plan of another self-driving vehicle.

DESCRIPTION OF EMBODIMENTS

Figure 1:
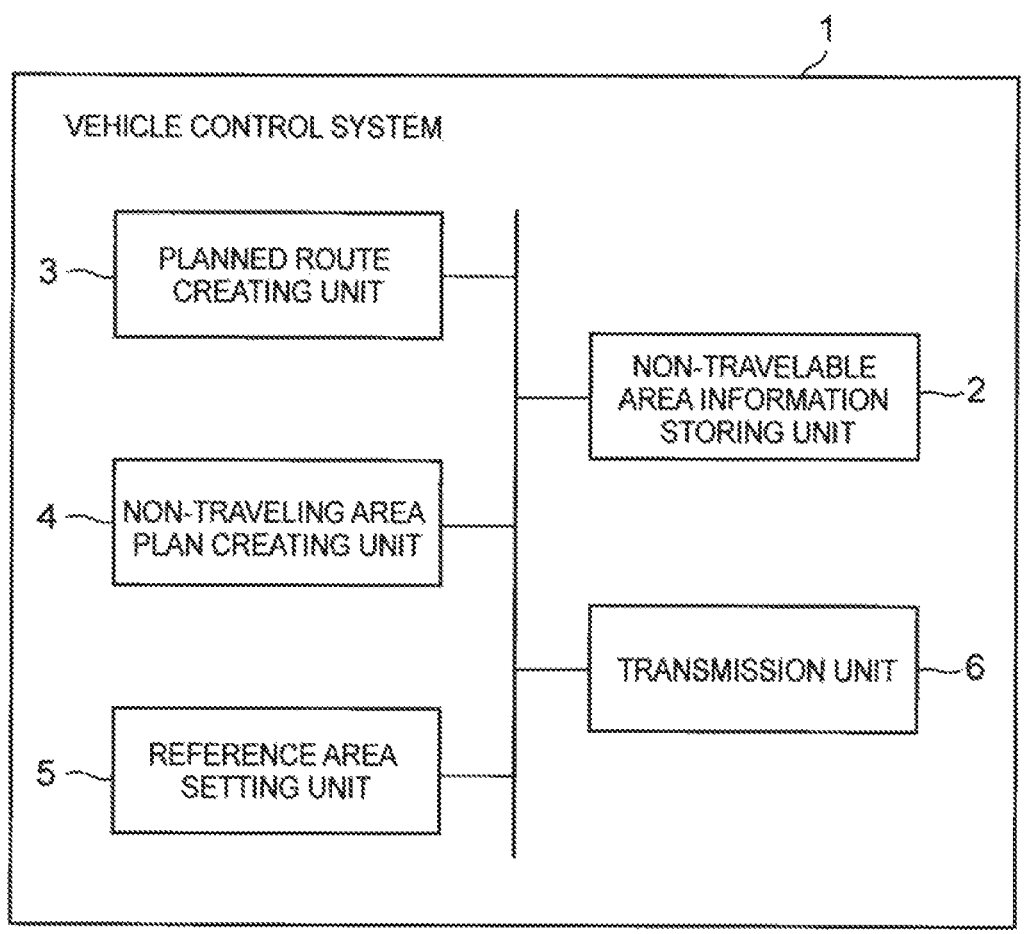
FIG. 1 It depicts a block diagram showing an example of a vehicle control system of the present invention.

An exemplary embodiment of the present invention will be described below with reference to drawings.

First, terms used to explain the present invention will be described.

In the present invention, a "self-driving vehicle" may be a car that the driver does not drive in any case while traveling, and may be a car driven by the driver in a case where the driver completely gives control to the car under a specific traffic condition and that specific traffic condition is not fulfilled. In the former case, it may be unattended.

Moreover, the "self-driving vehicle" of this invention can also be called an "autonomous traveling vehicle".

The "non-travelable area" is an area where the vehicle cannot travel physically or legally.

Specific examples of an area where a vehicle cannot travel physically include an area where there is an obstacle such as a telegraph pole, a position in a direction forming 90° with the traveling direction as the position after 0.1 seconds with respect to the current position, and a position at a distance of 10 meters or more from the current position as the position within 0.1 seconds in the traveling direction.

Further, specific examples of an area where a vehicle cannot legally travel include a sidewalk, a place inside a building or a park, an intersection of red lights, and a one-way road when traveling is reverse travel.

A "travelable area" is an area where a self-driving vehicle or a driver can travel physically and legally if it attempts to travel.

The "planned route" is a route planned by a self-driving vehicle as a traveling route. The self-driving vehicle sets a planned route within the travelable area. In the planned route, the time is associated with the position of the self-driving vehicle.

The "non-traveling area" is an area within the travelable area and set as an area where the self-driving vehicle does not travel. In other words, the "non-traveling area" is an area where the self-driving vehicle can travel and is an area set as an area where the self-driving vehicle does not travel.

The non-traveling area is an area set as an area where the self-driving vehicle can travel but does not travel, and is distinguished from a "non-travelable area" where it is originally not possible to travel. That is, the non-traveling area does not overlap with the non-travelable area. The definition of such terms is not intended to exclude the manner in which the self-driving vehicle described later transmits and receives an area including the non-traveling area and the non-travelable area.

The vehicle system of the present invention is provided in a self-driving vehicle and controls traveling of the self-driving vehicle. The vehicle system of the present invention executes "mission planning", "motion planning", and "control" as the operation of creating a plan for traveling of a self-driving vehicle.

The "mission planning" is, for example, an operation of setting a mission such as "turn right", "change lanes to left lane", "stop", "turn around", or the like. The mission may be referred to as a target state.

The "motion planning" is an operation of creating a planned route so as to achieve a mission, which is an output of mission planning.

The "control" is an operation of creating control information for controlling an accelerator, a brake, a steering, etc., so that a self-driving vehicle travels along a planned route.

The vehicle system of the present invention, for example, performs "mission planning" at 2 Hz, for example, performs "motion planning" at 25 Hz, and performs "control" at 10 Hz, for example.

FIG. 1 is a block diagram showing an example of a vehicle control system of the present invention.

A vehicle control system 1 according to the present invention includes a non-travelable area information storing unit 2, a planned route creating unit 3, a non-traveling area plan creating unit 4, a reference area setting unit 5, and a transmission unit 6.

The non-travelable area information storing unit 2 is a storage device for storing information (for example, information indicating an area where a sidewalk, a building, etc. exist) indicating the non-travelable area, and information (for example, information indicating an area of a one-way road) indicating an area that can become a non-travelable area depending on the state (for example, a traveling direction) of a self-driving vehicle or the like.

The planned route creating unit 3 creates a planned route of a self-driving vehicle (hereinafter, described as a self-driving vehicle A) on which the vehicle control system 1 is mounted, in accordance with the mission (output of the mission control) which the vehicle control system 1 has already set. Creation of a planned route corresponds to the above-mentioned "motion planning". Note that, illustration of the part which performs mission control is omitted.

The planned route creating unit 3 refers to the non-travelable area information storing unit 2 and specifies the non-travelable area. Furthermore, the planned route creating unit 3 determines that the area other than the non-travelable area is the travelable area. The planned route creating unit 3 creates a planned route within the travelable area. The planned route creating unit 3 creates, as a planned route, a planned route including information indicating the correspondence between the time of day and the position of the self-driving vehicle A.

The planned route creating unit 3 may create a planned route using a known algorithm, for example, such as Rapidly-Exploring Random Trees (RRT) or A-star (A*). The algorithm used to create the planned route is not limited to RRT or A*.

Figure 2:
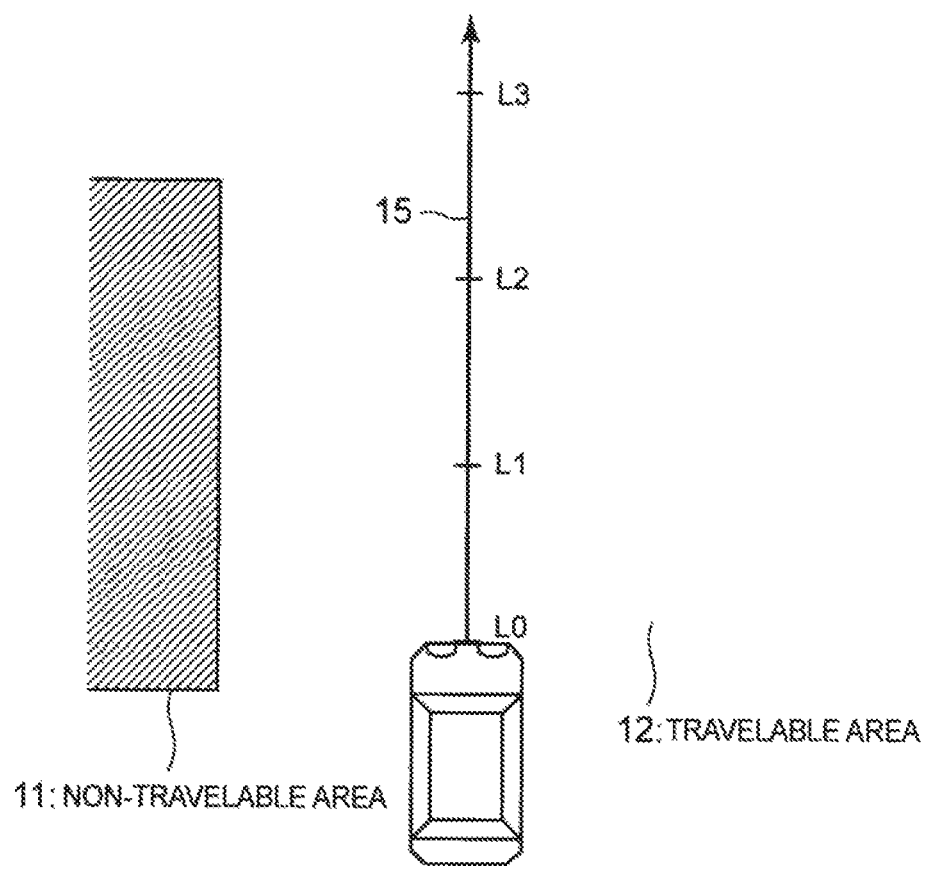
FIG. 2 It depicts a schematic diagram showing an example of a planned route.

FIG. 2 is a schematic diagram showing an example of a planned route. An area other than the non-travelable area 11 is a travelable area 12. The planned route creating unit 3 creates a planned route 15 within the travelable area 12. Although, for ease of explanation, FIG. 2 shows the case where the planned route 15 is a straight line, the planned route 15 may be a curve. In addition, t0 is the current time. t1, t2, and t3 are future times. In the example shown in FIG. 2, L0 is the position of the self-driving vehicle A at the current time t0. L1 is the position of the self-driving vehicle A at time t1. L2 is the position of the self-driving vehicle A at time t2. L3 is the position of the self-driving vehicle A at time t3.

The non-traveling area plan creating unit 4 creates a plan of the non-traveling area of the self-driving vehicle A on the basis of the planned route created by the planned route creating unit 3. As already described above, the non-traveling area is an area where the self-driving vehicle can travel and is an area set as an area where the self-driving vehicle does not travel.

The non-traveling area plan creating unit 4 creates a non-traveling area plan (hereinafter simply referred to as a non-traveling area plan) associated with the time. More specifically, the non-traveling area plan creating unit 4 creates a non-traveling area plan for each time zone.

Hereinafter, an example of the creation operation of the non-traveling area plan will be described. First, a first example of the creation operation of the non-traveling area plan will be described. In the first example, the non-traveling area plan creating unit 4 sets, as a non-traveling area, an area which is an area other than the area within Xm on both sides of the planned route and which does not overlap the non-travelable area 11, for each time zone. This means that the self-driving vehicle A (more specifically, the non-traveling area plan creating unit 4) determines not to travel in an area other than the area within Xm on both sides of the planned route.

Figure 3:
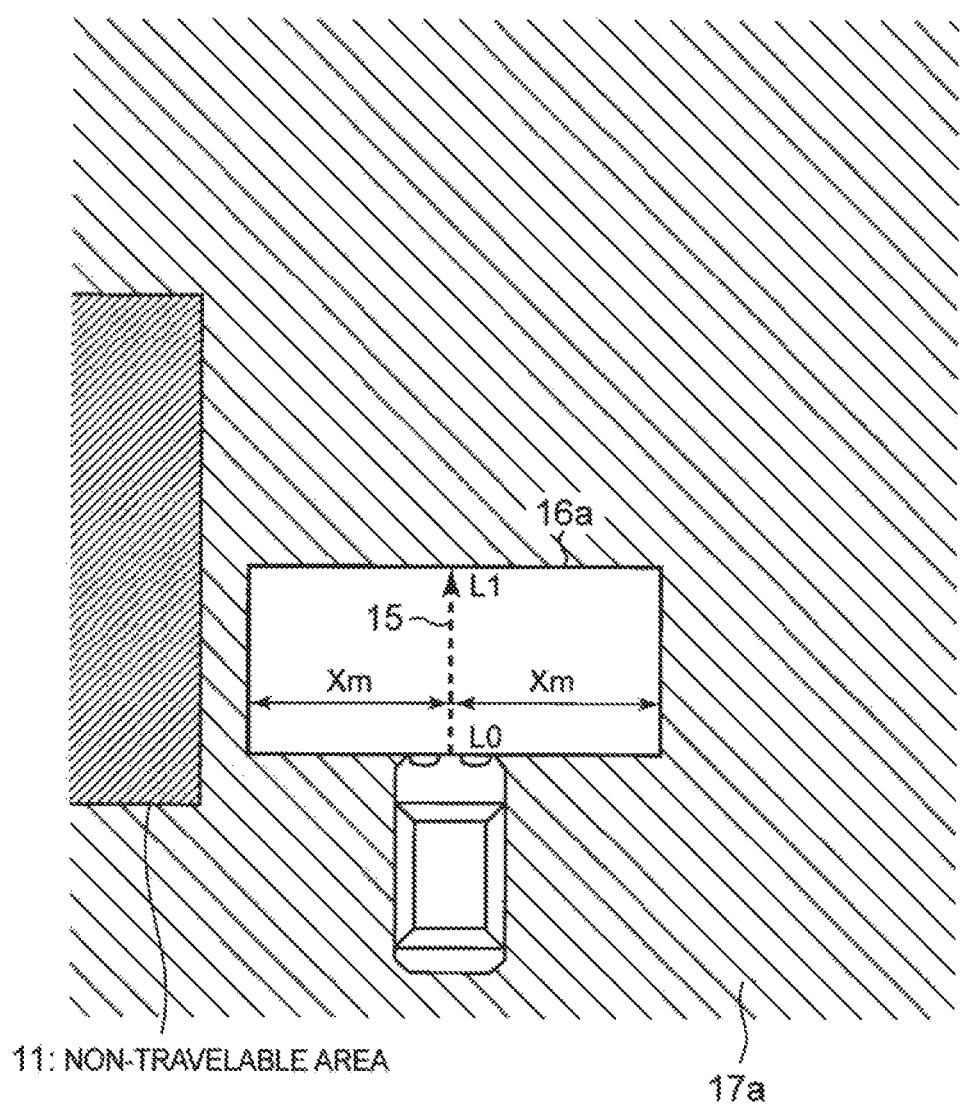
FIG. 3 It depicts a schematic diagram showing a non-traveling area of a self-driving vehicle A in a time zone t0 to t1.

FIG. 3 is a schematic diagram showing the non-traveling area of the self-driving vehicle A in the time zone t0 to t1. In FIG. 3, the planned route 15 in the time zone t0 to t1 is indicated by a broken line. An area 16a shown in FIG. 3 is an area within Xm on both sides of this planned route. Then, the non-traveling area plan creating unit 4 sets an area 17a which is an area other than the area 16a and does not overlap the non-travelable area 11, as a non-traveling area in the time zone t0 to t1.

Although the non-travelable area may also exist other than the non-travelable area 11 shown in FIG. 3, only the non-travelable area 11 is shown as the non-travelable area here in order to simplify the description. This point is the same in the other drawings such as FIG. 4.

Figure 4:
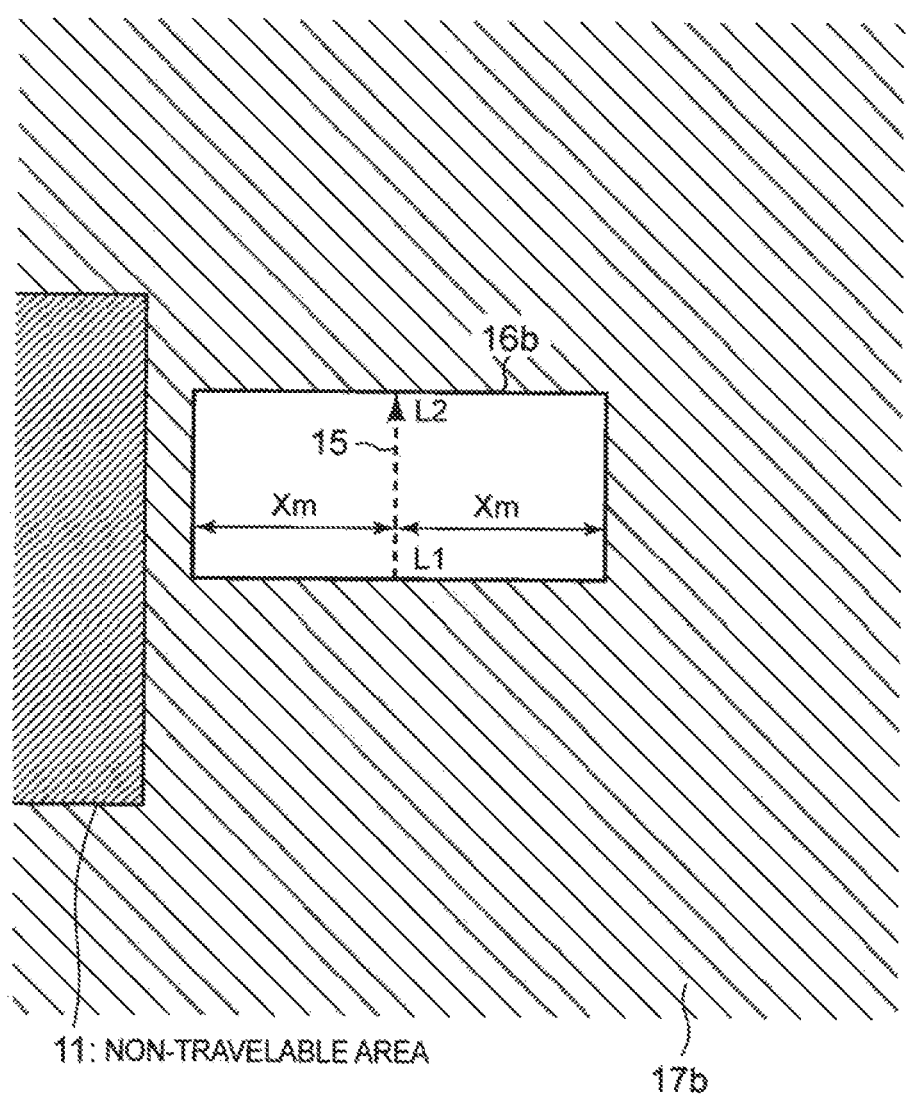
FIG. 4 It depicts a schematic diagram showing a non-traveling area of the self-driving vehicle A in a time zone t1 to t2.

FIG. 4 is a schematic diagram showing the non-traveling area of the self-driving vehicle A in the time zone t1 to t2. In FIG. 4, the planned route in the time zone t1 to t2 is indicated by a broken line. An area 16b shown in FIG. 4 is an area within Xm on both sides of this planned route. Then, the non-traveling area plan creating unit 4 sets an area 17b which is an area other than the area 16b and does not overlap the non-travelable area 11, as the non-traveling area in the time zone t1 to t2.

The non-traveling area plan creating unit 4 similarly sets the non-traveling area of the self-driving vehicle A also for each time zone after time t2. The length of the time zone (for example, t0 to t1, etc.) when setting the non-traveling area may be set in advance.

The non-traveling area set for each time zone is the non-traveling area plan. The above is the first example of the creation operation of the non-traveling area plan.

Figure 5:
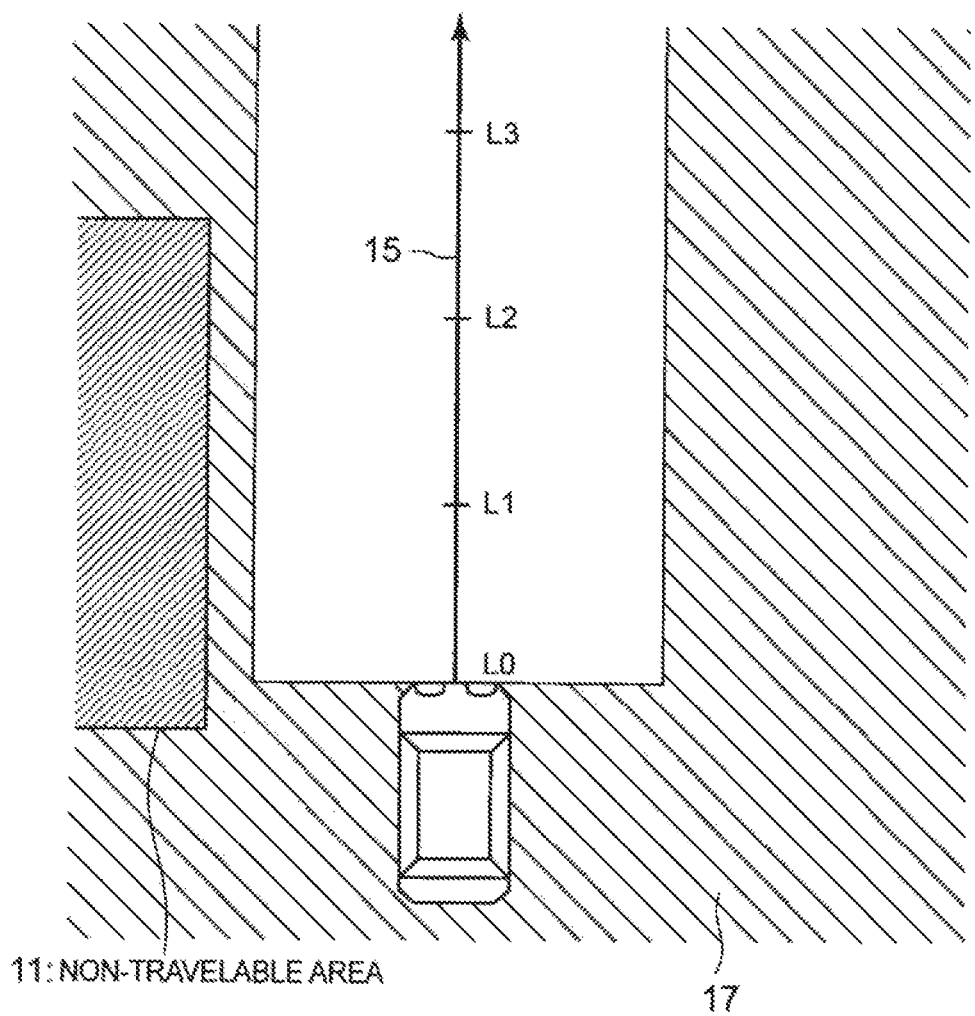
FIG. 5 It depicts a schematic diagram showing an example of a product set of non-traveling areas set for each time zone.

The product set of non-traveling areas set for each time zone as described above can be said to be an area which is an area within the travelable area and is set as an area where the self-driving vehicle does not travel at any time. FIG. 5 shows an example of a product set of non-traveling areas set for each time zone. An area 17 shown in FIG. 5 corresponds to this product set.

Next, a second example of a creation operation of the non-traveling area plan will be described. In this case, the planned route creating unit 3 obtains (derives) a plurality of planned routes by one or more algorithms in the process of finally setting one planned route. In this case, the planned route creating unit 3 sets an optimal planned route (for example, a planned route with the shortest route) from among the plurality of planned routes, as a final planned route.

In the second example, a non-traveling area plan is created based on a plurality of planned routes obtained by the planned route creating unit 3 in the process of setting the final planned route.

Figure 6:
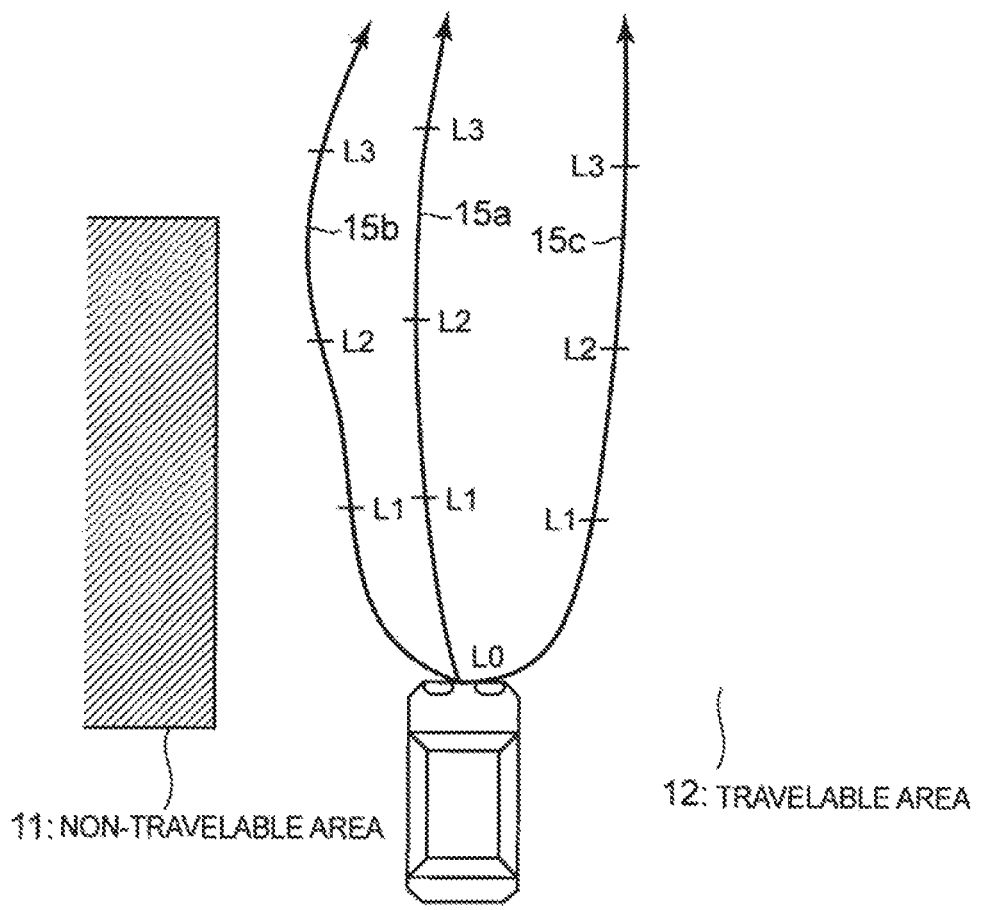
FIG. 6 It depicts an explanatory diagram showing an example of a plurality of planned routes.

FIG. 6 is an explanatory diagram showing an example of a plurality of planned routes. Although FIG. 6 illustrates three planned routes 15a to 15c, the number of planned routes is not limited to three. The planned route creating unit 3 creates each of the planned routes 15a to 15c in the travelable area 12. As in the previous case, t0 is the current time. t1, t2, and t3 are future times. In the example shown in FIG. 6, L0 is the position of the self-driving vehicle A at the current time t0. L1 is the position of the self-driving vehicle A at time t1. L2 is the position of the self-driving vehicle A at time t2. L3 is the position of the self-driving vehicle A at time t3.

Also in the second example, the non-traveling area plan creating unit 4 sets the non-traveling area for each time zone. The non-traveling area plan creating unit 4, when setting the non-traveling area of one time zone, specifies an area surrounded by outermost planned routes in that time zone, a line obtained by connecting the positions on the respective planned routes at the start time of that time zone, and a line obtained by connecting positions on the respective planned routes at the end time of the time zone. Then, the non-traveling area plan creating unit 4 sets an area which is an area other than that area and does not overlap the non-travelable area, as the non-traveling area. This means that it is determined that the self-driving vehicle A (more specifically, the non-traveling area plan creating unit 4) does not travel in an area other than that area. In order to simplify the description, FIG. 6 shows the case where the outermost planned routes are the planned route 15b and the planned route 15c without change in any time zone. By crossing of the planned routes, the outermost planned route may be replaced.

Figure 7:
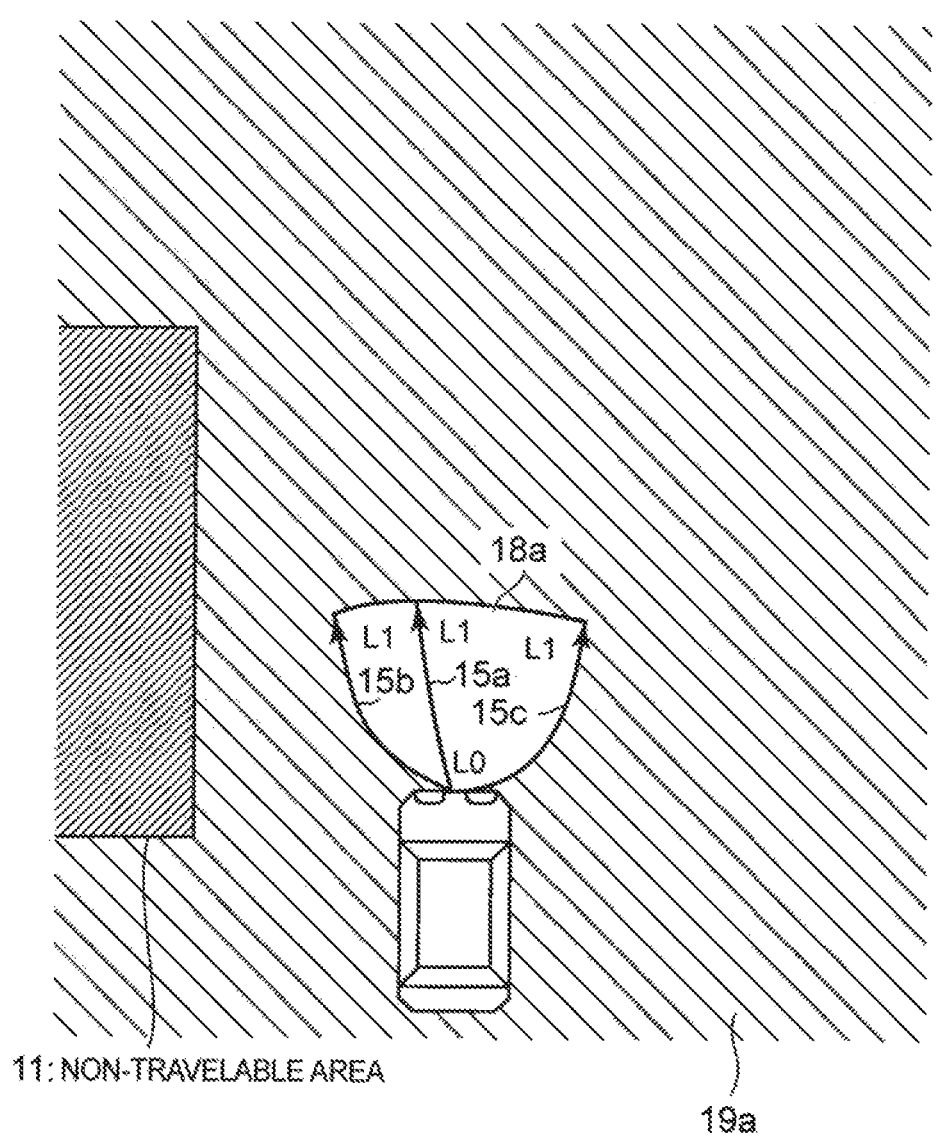
FIG. 7 It depicts a schematic diagram showing a non-traveling area of the self-driving vehicle A in a time zone t0 to t1.

FIG. 7 is a schematic diagram showing the non-traveling area of the self-driving vehicle A in the time zone t0 to t1. The planned routes that are outermost in this time zone are the planned route 15b and the planned route 15c. Also, the positions on the respective planned routes at time t0 are common. Further, a line obtained by connecting positions on the respective planned routes at time t1 is as shown in FIG. 7. Therefore, an area surrounded by the planned route 15b, the planned route 15c, the line obtained by connecting the positions on the respective planned routes at time t0 (this line is a point in this example), and the line obtained by connecting the positions on the respective planned routes at time t1 is an area 18a shown in FIG. 7. Then, the non-traveling area plan creating unit 4 sets an area 19a which is an area other than the area 18a and does not overlap the non-travelable area 11, as a non-traveling area in the time zone t0 to t1.

Figure 8:
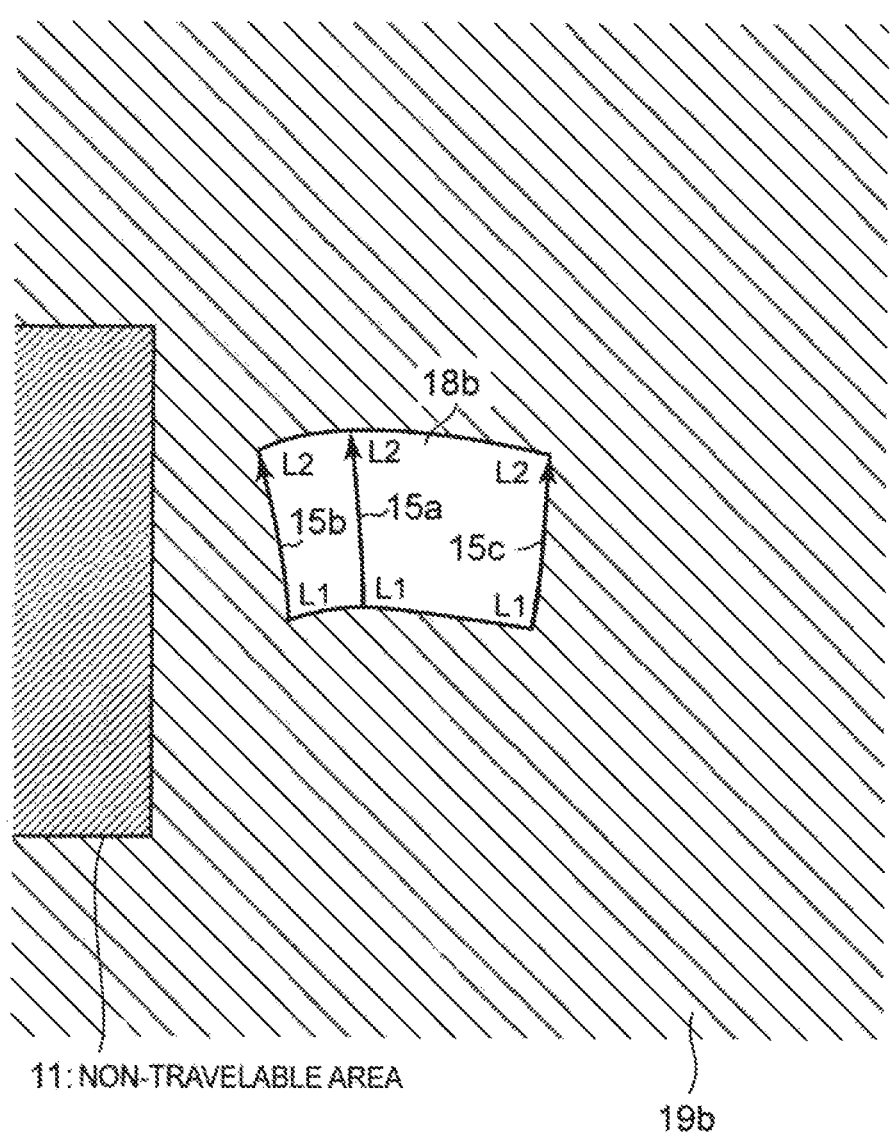
FIG. 8 It depicts a schematic diagram showing a non-traveling area of the self-driving vehicle A in a time zone t1 to t2.

FIG. 8 is a schematic diagram showing a non-traveling area of the self-driving vehicle A in the time zone t1 to t2. The planned routes that are outermost in this time zone are the planned route 15b and the planned route 15c. Further, a line obtained by connecting the positions on the respective planned routes at time t1 and a line obtained by connecting the positions on the respective planned routes at time t2 are as shown in FIG. 8. Therefore, an area surrounded by the planned route 15b, the planned route 15c, the line obtained by connecting the positions on the respective planned routes at time t1, and the line obtained by connecting the positions on the respective planned routes at time t2 is an area 18b shown in FIG. 8. Then, the non-traveling area plan creating unit 4 sets an area 19b which is an area other than the area 18b and does not overlap the non-travelable area 11, as the non-traveling area in the time zone t1 to t2.

The non-traveling area plan creating unit 4 similarly sets the non-traveling area of the self-driving vehicle A also for each time zone after time t2. As already described above, the length of the time zone (for example, t0 to t1, etc.) when setting the non-traveling area may be set in advance.

The non-traveling area set for each time zone is the non-traveling area plan. The above is the second example of the creation operation of the non-traveling area plan.

Figure 9:
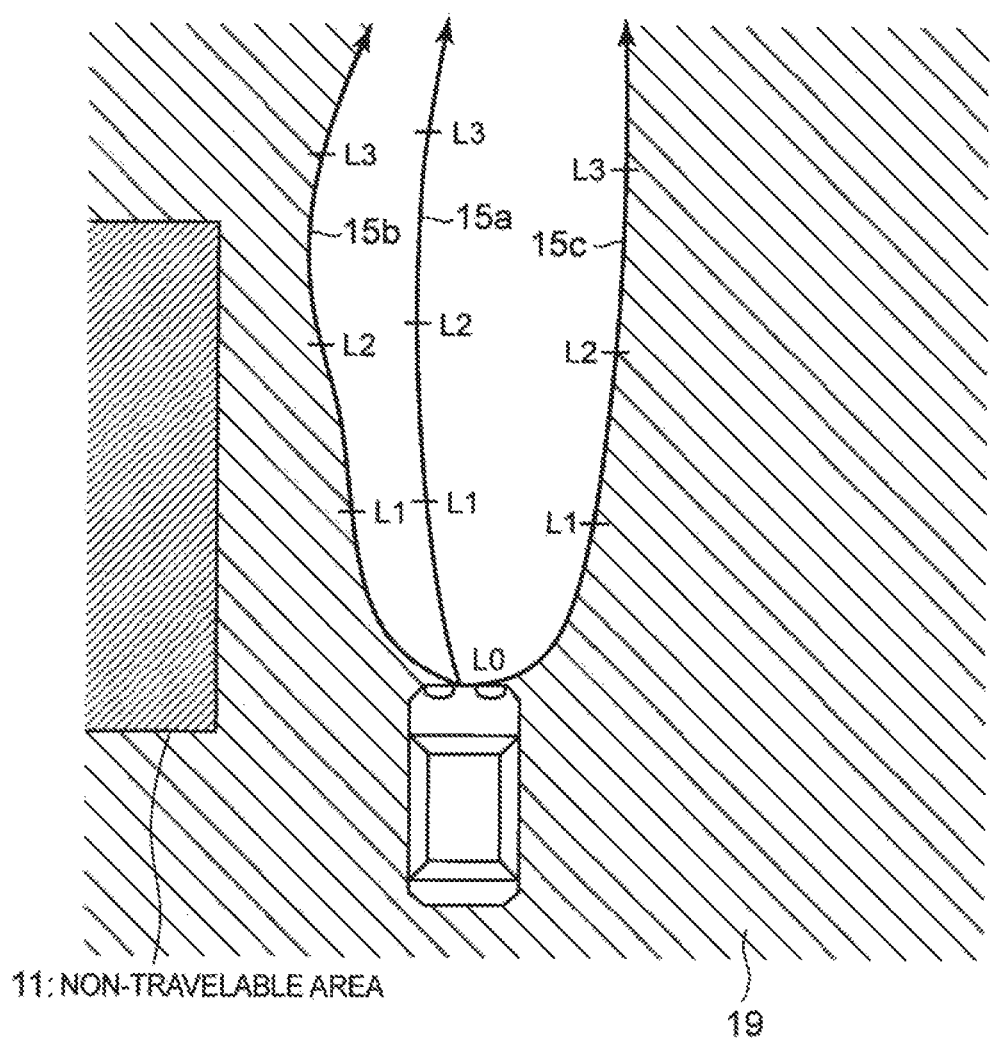
FIG. 9 It depicts a schematic diagram showing an example of a product set of non-traveling areas set for each time zone.

The product set of non-traveling areas set for each time zone as described above can be said to be an area which is an area within the travelable area and is set as an area where the self-driving vehicle does not travel at any time. FIG. 9 shows an example of a product set of non-traveling areas set for each time zone. The area 19 shown in FIG. 9 corresponds to this product set.

It can be said that an area other than the area 19 (an area not indicated by hatching in FIG. 9) in the travelable area 12 is an area which may include a planned route created at a time later than the current time under the same mission. Let m be the current mission. Under mission m, the set of planned routes that can be created at time t is denoted as $P_t(m)$. Also, let the current time be t0. It can be said that the area other than the area 19 in the travelable area 12 includes an area represented as follows.

$$\bigcup_{t \geq t0} P_t(m)$$ [Math. 1]

In the example shown in FIG. 5, the same applies to an area other than the area 17 (an area not hatched in FIG. 5) in the travelable area 12.

The first example and the second example have been described as examples of the creation operation of the non-traveling area plan. The creation operation of the non-traveling area plan is not limited to the above two examples, and the non-traveling area plan creating unit 4 may create the non-traveling area plan by another method.

Figure 10:
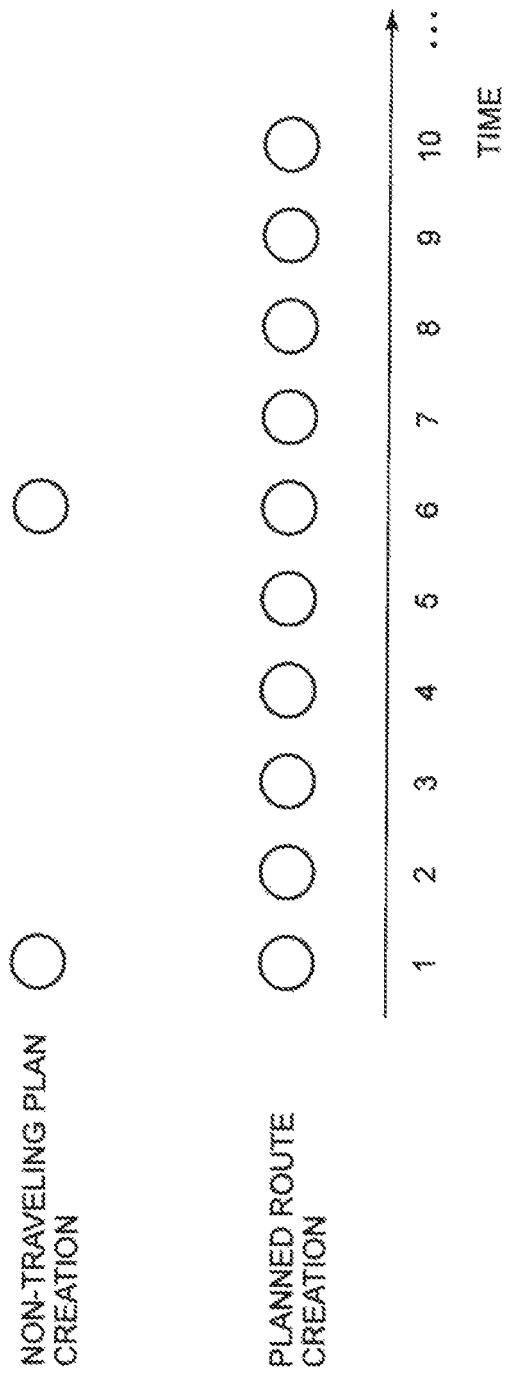
FIG. 10 It depicts a schematic diagram showing a creation frequency of a non-traveling area plan and a creation frequency of a planned route.

The non-traveling area plan creating unit 4 creates a non-traveling area plan at a frequency lower than the frequency at which the planned route creating unit 3 creates a planned route. For example, the planned route creating unit 3 creates a planned route at 25 Hz. In addition, the non-traveling area plan creating unit 4 creates a non-traveling area plan, for example, at 5 Hz. However, the value such as 5 Hz shown here is an example, and it is sufficient if the creation frequency of the non-traveling area plan is lower than the creation frequency of the planned route. FIG. 10 is a schematic diagram showing the creation frequency of the non-traveling area plan and the creation frequency of the planned route. The horizontal axis shown in FIG. 10 represents time. In addition, circular markers shown in FIG. 10 indicate the timing of creating a planned route and the timing of creating a non-traveling area plan. In the present invention, as shown in FIG. 10, the frequency at which the non-traveling area plan creating unit 4 creates the non-traveling area plan is lower than the frequency at which the planned route creating unit 3 creates the planned route.

In the following description, the planned route creating unit 3 creates a planned route at 25 Hz, and the non-traveling area plan creating unit 4 creates a non-traveling area plan at 5 Hz as an example.

The transmission unit 6 broadcasts the non-traveling area plan to the self-driving vehicles existing in the vicinity every time the non-traveling area plan creating unit 4 creates the non-traveling area plan. At this time, the transmission unit 6 broadcasts also the identification information of the self-driving vehicle A together with the non-traveling area plan. This is to allow other self-driving vehicles that have received the non-traveling area plan to respond to the self-driving vehicle A.

In addition, the transmission unit 6 should just transmit the non-traveling area plan and the identification information of the self-driving vehicle A and does not transmit the planned route.

Moreover, the aspect of inter-vehicle communication which the transmission unit 6 performs is not specifically limited. For example, the transmission unit 6 may perform inter-vehicle communication using radio waves. Also, for example, the transmission unit 6 may perform inter-vehicle communication using infrared rays.

The reference area setting unit 5 sets an area which is an area having a width including the planned route created by the planned route creating unit 3 and serves as a determination reference of whether the non-traveling area plan creating unit 4 creates a non-traveling area plan again without depending on the set frequency (in this example, frequency of 5 Hz). Hereinafter, this area is referred to as a reference area. The reference area setting unit 5 sets a reference area when the non-traveling area plan is created.

Figure 11:
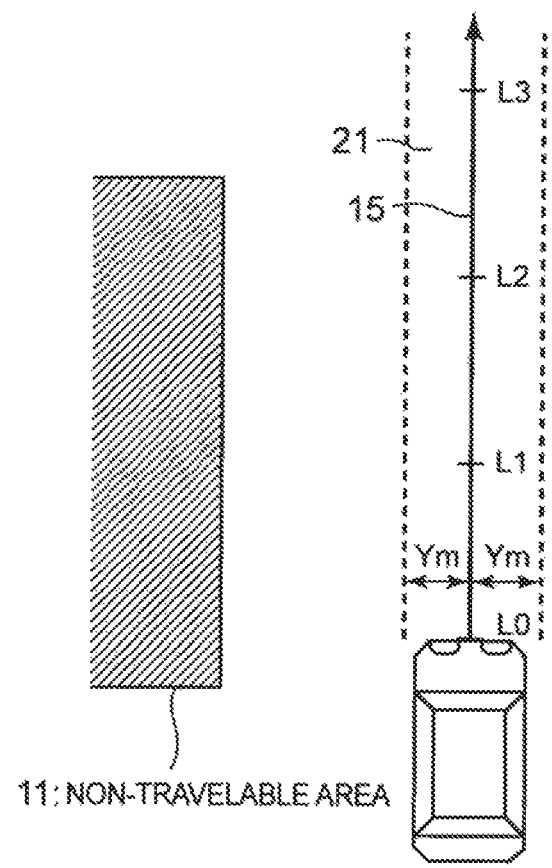
FIG. 11 It depicts a schematic diagram showing an example of a reference area.

When the non-traveling area plan creating unit 4 creates a non-traveling area plan by the method shown in the first example described above, the reference area setting unit 5 sets, as a reference area, an area within Ym on both sides of the planned route (for example, the planned route 15 shown in FIG. 2) used by the non-traveling area plan creating unit 4 for creating the non-traveling area plan. However, Ym is a value smaller than the above-mentioned Xm (refer to FIG. 3 and FIG. 4). FIG. 11 is a schematic diagram showing an example of the reference area. In the example shown in FIG. 11, an area centered on the planned route 15, which is sandwiched by two broken lines, corresponds to a reference area 21.

Figure 12:
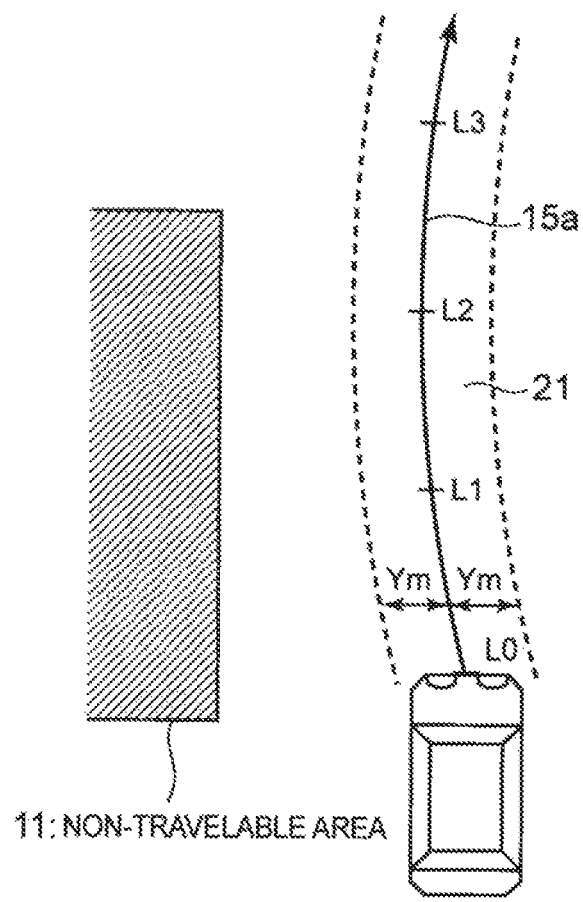
FIG. 12 It depicts a schematic diagram showing another example of the reference area.

Further, when the non-traveling area plan creating unit 4 creates a non-traveling area plan by the method shown in the above-described second example, the planned route creating unit 3 derives a plurality of planned routes in the process of finally setting one planned route and sets, as a final planned route, an optimal planned route from among the plurality of planned routes. The reference area setting unit 5 sets an area within Ym on both sides of the planned route, as a reference area. FIG. 12 is a schematic diagram showing another example of the reference area. It is assumed that the planned route creating unit 3 sets the planned route 15a shown in FIG. 6 as the optimal planned route. In this case, the reference area setting unit 5 sets an area within Ym on both sides of the planned route 15a as the reference area 21. In the example shown in FIG. 12, an area centered on the planned route 15a, which is sandwiched by two broken lines, corresponds to the reference area 21.

When the planned route newly created by the planned route creating unit 3 deviates from the reference area 21, the non-traveling area plan creating unit 4 creates the non-traveling area plan again regardless of the set frequency (frequency of 5 Hz in this example). That is, when the new planned route deviates from the reference area 21, the non-traveling area plan creating unit 4 newly creates the non-traveling area plan even if it is not the set timing. For example, in the example shown in FIG. 10, the non-traveling area plan creating unit 4 creates the non-traveling area plan at times "1" and "6". Then, for example, when the planned route created at time "3" deviates from the reference area 21 set at time "1", the non-traveling area plan creating unit 4 newly creates the non-traveling area plan at that timing. In addition, since the non-traveling area plan is newly created, the reference area setting unit 5 newly sets a reference area.

The planned route creating unit 3, the non-traveling area plan creating unit 4, the reference area setting unit 5, and the transmission unit 6 (excluding hardware for communication) are realized, for example, by a computer operating according to a vehicle control program. This computer is provided to the self-driving vehicle A. In this case, the computer reads a vehicle control program from a program recording medium such as a program storage device included in the computer, and may operate, according to the vehicle control program, as the planned route creating unit 3, the non-traveling area plan creating unit 4, the reference area setting unit 5, and the transmission unit 6. Note that hardware for communication (communication interface) is connected to the computer.

The vehicle control system 1 also includes a traveling control unit (not shown) that controls the self-driving vehicle A so as to cause the self-driving vehicle A to travel along the planned route created by the planned route creating unit 3. The traveling control unit and the portion for executing the mission control are also realized, for example, by the above-described computer that operates according to the vehicle control program.

Figure 13:
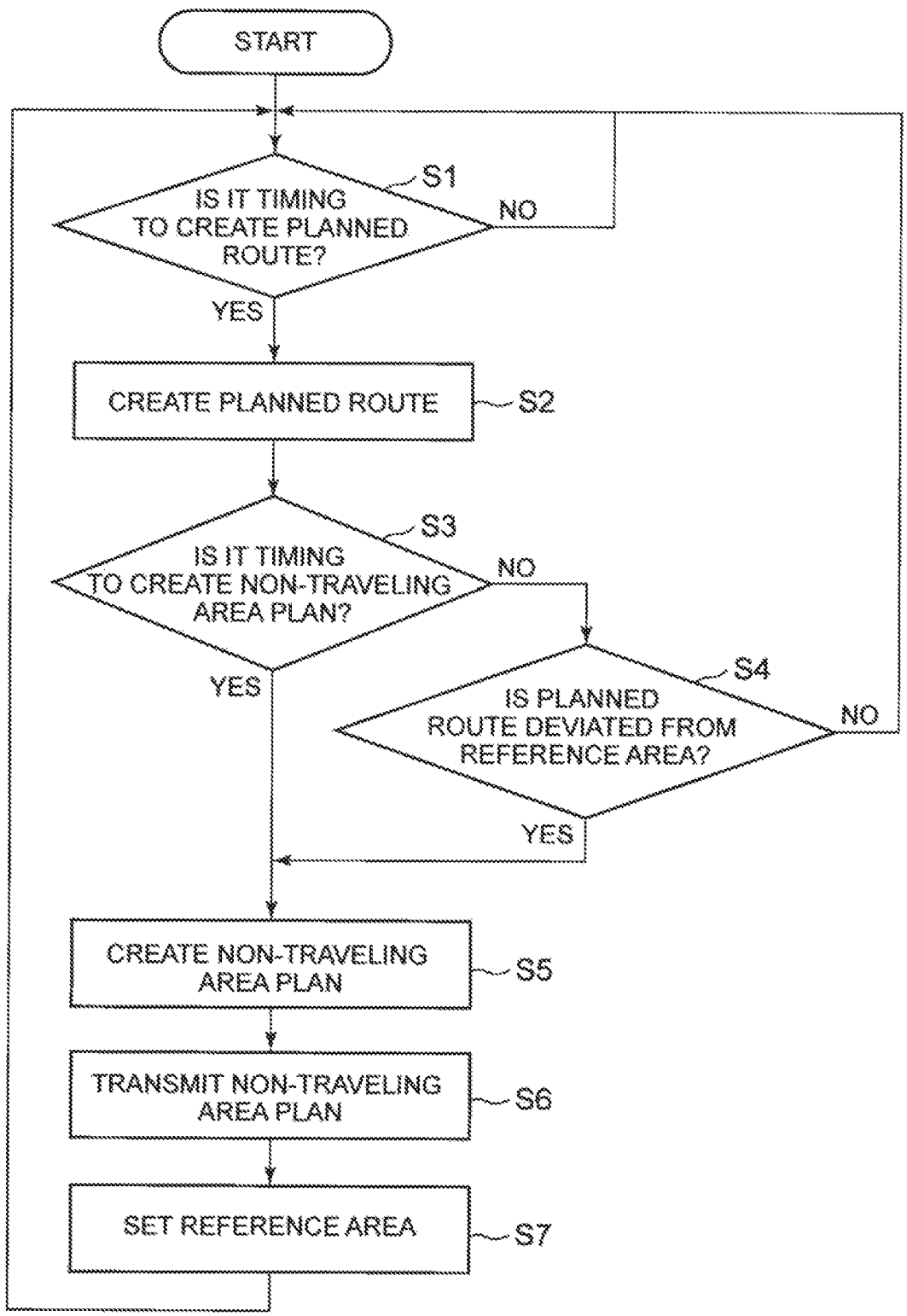
FIG. 13 It depicts a flowchart showing an example of a processing progress of the present invention.

Next, the processing progress of the present invention will be described. FIG. 13 is a flowchart showing an example of a processing progress of the present invention. In addition, since the operation of each element of the vehicle control system 1 is already described, the detailed description of the operation is omitted here. Further, steps S1 to S7 shown in FIG. 13 are repetitive processing, and the description will be provided assuming that the reference area is set in step S7 executed most recently.

The planned route creating unit 3 determines whether it is timing to create the planned route (step S1). If it is not the timing to create the planned route (No in step S1), the planned route creating unit 3 waits until the creation timing of the planned route.

When it is the timing to create a planned route (Yes in step S1), the planned route creating unit 3 creates the planned route (step S2).

Next, the non-traveling area plan creating unit 4 determines whether it is timing to create the non-traveling area plan (step S3). If it is the timing to create the non-traveling area plan (Yes in step S3), the process proceeds to step S5.

If it is not the timing to create the non-traveling area plan (No in step S3), the non-traveling area plan creating unit 4 determines whether the planned route created in step S2 is deviated from the reference area already set (step S4). If the planned route is deviated from the reference area (Yes in step S4), the process proceeds to step S5. If the planned route is not deviated from the reference area (No in step S4), the process returns to step S1.

When the process proceeds to step S5 from step S3 or step S4, the non-traveling area plan creating unit 4 creates a non-traveling area plan (step S5). The non-traveling area plan creating unit 4 may create the non-traveling area plan on the basis of the planned route created in the latest step S2. Alternatively, the non-traveling area plan creating unit 4 may create the non-traveling area plan on the basis of a plurality of planned routes obtained in the process of setting the final planned route in the latest step S2.

Next, the transmission unit 6 broadcasts the non-traveling area plan (the non-traveling area for each time zone) created in step S5 and information including the self-driving vehicle A to self-driving vehicles in the vicinity (step S6).

Next, the reference area setting unit 5 sets a reference area on the basis of the planned route created in the latest step S2 (step S7). After step S7, the process returns to step S1.

Another self-driving vehicle (denoted as a self-driving vehicle B) that receives the non-traveling area plan of the self-driving vehicle A from the self-driving vehicle A including the vehicle control system 1 of the present invention can create a planned route of the self-driving vehicle B, based on the non-traveling area plan. The non-traveling area plan of the self-driving vehicle A is an area set as an area where the self-driving vehicle A does not travel. Therefore, the self-driving vehicle B can create a safe planned route by creating a planned route of the self-driving vehicle B in the non-traveling area.

Further, even if the self-driving vehicle A updates the planned route due to a change in the road surface conditions, a sudden crosswind, etc., the change in the planned route is small, so the non-traveling area can be treated as not changing. Therefore, the creation frequency of the non-traveling area can be made lower than the creation frequency of the planned route.

Furthermore, even if the planned route is created, the transmission unit 6 does not transmit the planned route, and when the non-traveling area plan is created, transmits the non-traveling area plan to self-driving vehicles in the vicinity. Therefore, according to the present invention, the frequency of inter-vehicle communication can be reduced.

Furthermore, the other self-driving vehicle B that receives the non-traveling area plan of the self-driving vehicle A can create the planned route of the self-driving vehicle B, based on the non-traveling area plan of the self-driving vehicle A as described above. In addition, since the self-driving vehicle B does not receive the planned route of the self-driving vehicle A, it is not necessary to determine whether to review the route plan of the host vehicle according to the planned route of the self-driving vehicle A. Therefore, the processing load of the self-driving vehicle B can be reduced.

In addition, when transmitting a non-traveling area plan, the transmission unit 6 may together transmit the planned route created in the most recent step S2 at the time of creating the non-traveling area plan. Even in such a case, the self-driving vehicle B may create a planned route of the self-driving vehicle B, based on the non-traveling area plan, and the planned route may not be particularly referred to.

Further, according to the present invention, the non-traveling area plan creating unit 4 creates the non-traveling area plan when the new planned route deviates from the reference area 21 even if it is not the set timing. Therefore, when the change in the planned route is large, it is possible to newly create the non-traveling area plan.

Note that, the planned route creating unit 3 of the self-driving vehicle A may receive the non-traveling area plan of the self-driving vehicle B created by another self-driving vehicle B. In that case, the planned route creating unit 3 of the self-driving vehicle A may set the planned route of the self-driving vehicle A within the non-traveling area of the self-driving vehicle B.

Figure 14:
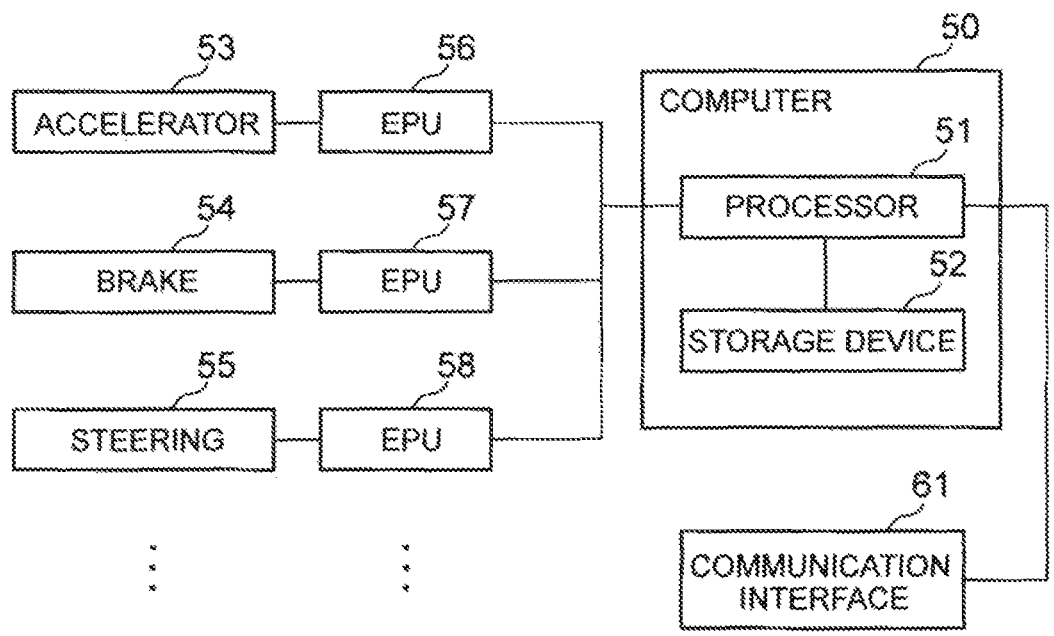
FIG. 14 It depicts a schematic diagram showing an example of a computer for realizing the vehicle control system of the present invention, and elements in a self-driving vehicle including the computer.

FIG. 14 is a schematic diagram showing an example of a computer for realizing the vehicle control system 1 of the present invention, and elements in a self-driving vehicle including the computer. The vehicle control system 1 of the present invention is realized by a computer 50. The computer 50 includes a storage device 52 and a processor 51. The operation of the vehicle control system 1 of the present invention is stored in the storage device 52 in the form of a program. The processor 51 reads the program from the storage device 52 and operates as the vehicle control system 1 according to the program.

The self-driving vehicle also includes a communication interface 61. The communication interface 61 is connected to the computer 50, and the processor 51 performs inter-vehicle communication via the communication interface 61.

Further, the processor 51 controls the self-driving vehicle so as to cause the self-driving vehicle to travel along the planned route. For example, the processor 51 outputs control information for controlling an accelerator 53 to an EPU (Electronic Control Unit) 56 corresponding to the accelerator 53, and controls the accelerator 53 via the EPU 56. Similarly, the processor 51 outputs control information for controlling a brake 54 to an EPU 57 corresponding to the brake 54, and controls the brake 54 via the EPU 57. Similarly, the processor 51 outputs control information for controlling a steering 55 to an EPU 58 corresponding to the steering 55, and controls the steering 55 via the EPU 58. Although the accelerator 53, the brake 54, and the steering 55 are illustrated in FIG. 14, the processor 51 similarly controls other elements in the self-driving vehicle.

Also, some or all of the components shown in FIG. 1 may be realized by a general purpose or special purpose circuit (circuitry), a processor or the like, or a combination thereof. These may be configured by a single chip or may be configured by a plurality of chips connected via a bus. Some or all of the components may be realized by a combination of the above-described circuitry and the like and a program.

Figure 15:
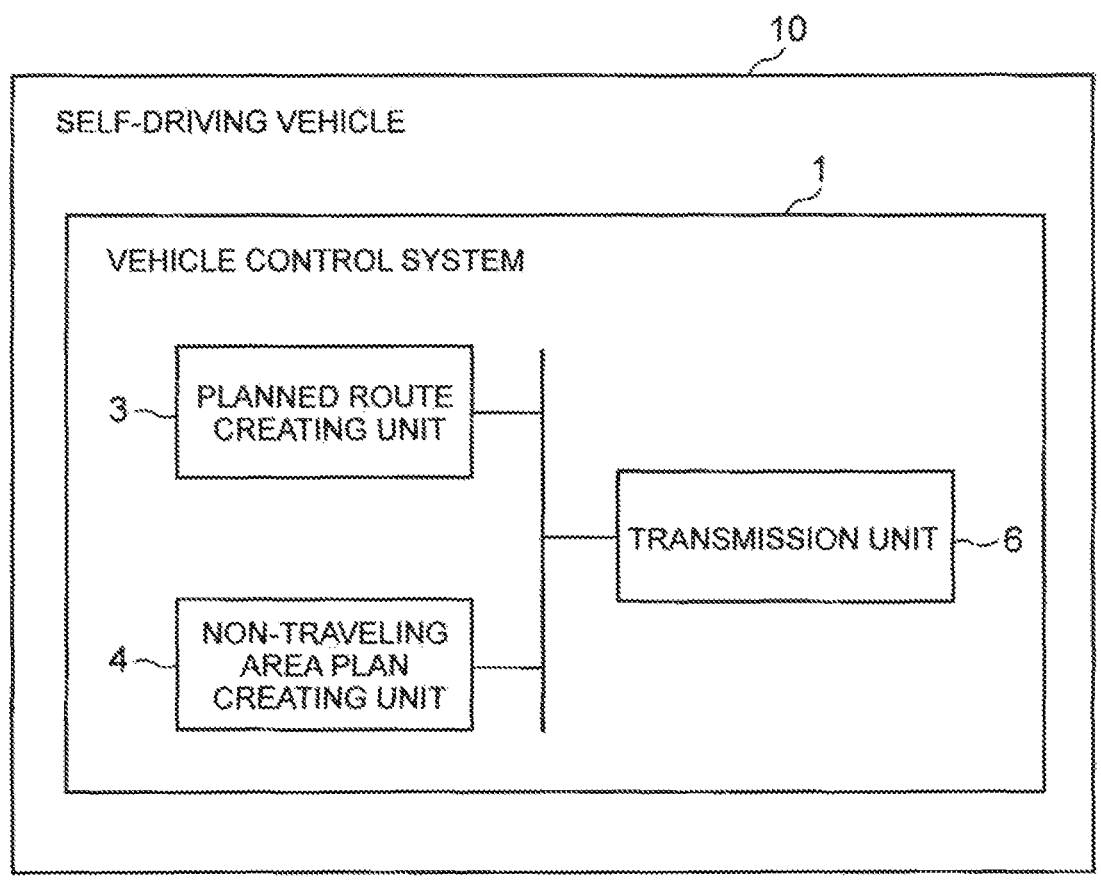
FIG. 15 It depicts a block diagram showing an outline of the present invention.

Next, an outline of the present invention will be described. FIG. 15 is a block diagram showing an outline of the present invention. The vehicle control system 1 of the present invention is provided in a self-driving vehicle 10. The vehicle control system 1 further includes a planned route creating unit 3, a non-traveling area plan creating unit 4, and a transmission unit 6.

The planned route creating unit 3 creates a planned route of the self-driving vehicle 10.

The non-traveling area plan creating unit 4 creates a plan of the non-traveling area, which is an area where the self-driving vehicle 10 can travel and which is an area set as an area where the self-driving vehicle 10 does not travel.

The transmission unit 6 transmits the plan of the non-traveling area to other vehicles.

The non-traveling area plan creating unit 4 creates the plan of the non-traveling area at a frequency lower than the frequency at which the planned route creating unit 3 creates a planned route.

The transmission unit 6 transmits the plan of the non-traveling area to other vehicles each time the plan of the non-traveling area is created.

Such a configuration can reduce the frequency of inter-vehicle communication and reduce the processing load of the self-driving vehicle that receives a plan of another self-driving vehicle.

In addition, a reference area setting unit (for example, the reference area setting unit 5) that sets a reference area which is an area having a width including the planned route and which serves as a determination criterion of whether the non-traveling area plan creating unit 4 creates the plan of the non-traveling area again regardless of a set frequency may be included, and the non-traveling area plan creating unit 4 may be configured to create the plan of the non-traveling area again when a planned route newly created by the planned route creating unit 3 deviates from the reference area.

Further, the non-traveling area plan creating unit 4 may be configured to create the plan of the non-traveling area on the basis of the planned route or a plurality of planned routes obtained in the process of creating the planned route.

The present invention may also be applied to unattended aerial vehicles. When the present invention is applied to an unattended aerial vehicle, the unattended aerial vehicles transmit and receive air areas.

INDUSTRIAL APPLICABILITY

The present invention is suitably applied to a vehicle control system mounted on a self-driving vehicle.

REFERENCE SIGNS LIST

1 Vehicle control system
2 Non-travelable area information storing unit
3 Planned route creating unit
4 Non-traveling area plan creating unit
5 Reference area setting unit
6 Transmission unit
10 Self-driving vehicle

What is claimed is:
1. A vehicle control system provided in a self-driving vehicle, the vehicle control system, comprising:
at least one memory configured to store instructions; and
at least one processor configured to execute the instructions to;
create a planned route of the self-driving vehicle;

create a plan of a non-traveling area, which is an area where the self-driving vehicle can travel and which is an area set as an area where the self-driving vehicle does not travel; and transmit the plan of the non-traveling area to other vehicles, wherein, the at least one processor creates the plan of the non-traveling area at a frequency lower than a frequency at which the at least one processor creates the planned route, and the at least one processor transmits the plan of the non-traveling area to other vehicles each time the plan of the non-traveling area is created.

2. The vehicle control system according to claim 1, wherein, the at least one processor is further configured to execute the instructions to;

set a reference area which is an area having a width including the planned route and which serves as a determination criterion of whether the at least one processor creates the plan of the non-traveling area again regardless of a set frequency, wherein the at least one processor creates the plan of the non-traveling area again when a planned route newly created by the at least one processor deviates from the reference area.

3. The vehicle control system according to claim 2, wherein the at least one processor creates the plan of the non-traveling area on a basis of the planned route or a plurality of planned routes obtained in the process of creating the planned route.

4. A self-driving vehicle comprising a vehicle control system according to claim 2.

5. The vehicle control system according to claim 1, wherein the at least one processor creates the plan of the non-traveling area on a basis of the planned route or a plurality of planned routes obtained in the process of creating the planned route.

6. A self-driving vehicle comprising a vehicle control system according to claim 5.

7. A self-driving vehicle comprising a vehicle control system according to claim 1.

8. A vehicle control method, by a computer provided in a self-driving vehicle, comprising:

creating a planned route of the self-driving vehicle;

creating a plan of a non-traveling area, which is an area where the self-driving vehicle can travel and which is an area set as an area where the self-driving vehicle does not travel at a frequency lower than a frequency at which the planned route is created; and transmitting the plan of the non-traveling area to other vehicles each time the plan of the non-traveling area is created.

9. A non-transitory computer-readable recording medium in which a vehicle control program is recorded, the vehicle control program installed in a computer provided in a self-driving vehicle, the vehicle control program causing the computer to execute:

planned route creation processing for creating a planned route of the self-driving vehicle;

non-traveling area plan creation processing for creating a plan of a non-traveling area, which is an area where the self-driving vehicle can travel and which is an area set as an area where the self-driving vehicle does not travel; and transmission processing for transmitting the plan of the non-traveling area to other vehicles, wherein the non-traveling area plan creation processing creates the plan of the non-traveling area at a frequency lower than a frequency at which the planned route creation processing creates the planned route, and the transmission processing transmits the plan of the non-traveling area to other vehicles each time the plan of the non-traveling area is created.

* * * * *